United States Patent [19]
Stauffer

[11] 4,410,804
[45] Oct. 18, 1983

[54] TWO DIMENSIONAL IMAGE PANEL WITH RANGE MEASUREMENT CAPABILITY

[75] Inventor: Norman L. Stauffer, Englewood, Colo.

[73] Assignee: Honeywell Inc., Minneapolis, Minn.

[21] Appl. No.: 282,379

[22] Filed: Jul. 13, 1981

[51] Int. Cl.³ .................. G01C 3/08; H04N 9/56
[52] U.S. Cl. .................. 250/578; 250/216; 358/92; 356/4
[58] Field of Search .......... 250/209, 558, 578, 216; 355/41; 354/31, 114, 115; 356/4; 358/88, 91, 92

[56] References Cited
U.S. PATENT DOCUMENTS

| 3,248,552 | 4/1966 | Bryan | 250/209 X |
| 3,387,532 | 6/1968 | Houghton et al. | 355/41 |
| 3,611,899 | 10/1971 | Ataka et al. | 354/114 |
| 3,746,454 | 7/1973 | Pace et al. | 250/578 X |
| 3,852,524 | 12/1974 | Ando et al. | 358/91 |
| 4,185,191 | 1/1980 | Stauffer . | |
| 4,286,286 | 8/1981 | Jurisson et al. . | |

FOREIGN PATENT DOCUMENTS 2917253 11/1979 Fed. Rep. of Germany ...... 250/578

Primary Examiner—David C. Nelms
Assistant Examiner—Edward P. Westin
Attorney, Agent, or Firm—Charles J. Ungemach

[57] ABSTRACT

A two dimensional optical array of lenslets and detectors is provided. The outputs of the detectors are combined to produce a signal indicative of the characteristics of an object being viewed while the output of selected detectors are compared to produce a signal indicative of the range to the object.

6 Claims, 4 Drawing Figures

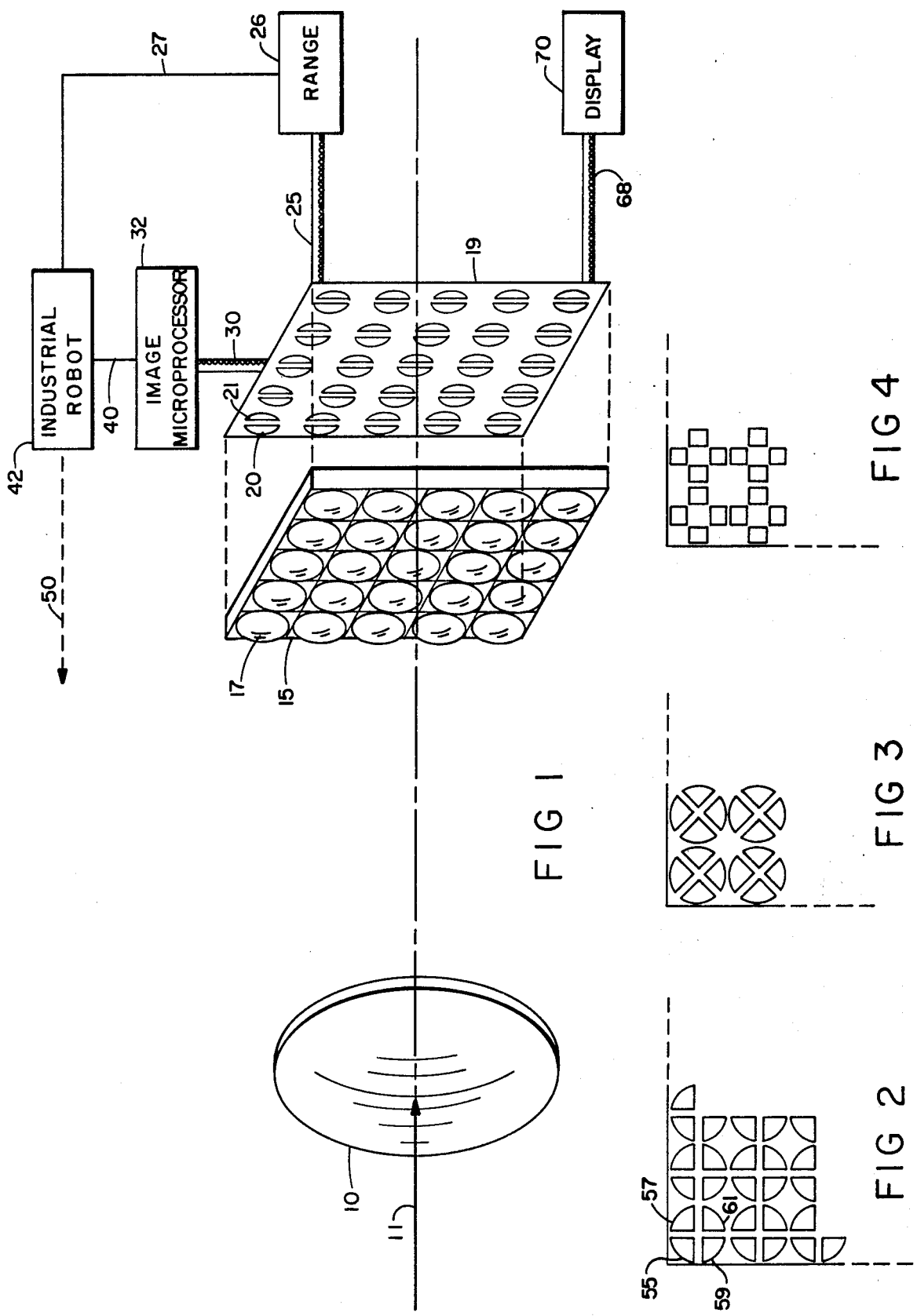

TWO DIMENSIONAL IMAGE PANEL WITH RANGE MEASUREMENT CAPABILITY

BACKGROUND OF THE INVENTION

In my U.S. Pat. No. 4,185,191, issued Jan. 22, 1980, I disclose an invention for use in auto focus cameras to determine the range to a remote object by the use of pairs of detectors mounted in a row behind a corresponding row of small lenslets which receive light from the remote object through the taking lens of the camera. Each of the detector pairs receives an image of the exit pupil of the taking lens and if the object is in proper focus, the amount of radiation received by each detector in the pair will be approximately the same. If the object is not in focus, then the amount of radiation received by the detectors will not be the same and by analyzing the outputs of the individual detectors in each pair, a pair of curves may be generated, the relative displacement of which is indicative of the range to the object.

Also in the prior art are optical systems which utilize a matrix of optical detectors positioned so as to receive an image of a remote object and usually, by use of a properly programmed computer, certain characteristics of the object may be determined. Such systems may be found not only in character recognition systems, but in robotics where arms are controlled to, for example, pick up elements passing by on a conveyor belt.

One difficulty found with robotic systems is that while the computer may be programmed to recognize an object in a two dimensional view thereof, the image processing equipment is not able to simultaneously determine the distance to the object being sensed and accordingly, unless the objects are always positioned a known distance from the robot arm, the robot may not be able to locate the object it wishes to pick up.

SUMMARY OF THE INVENTION

The present invention is intended to overcome the difficulties in the prior art by establishing an array of detectors capable of producing outputs not only indicative of the shape or identity of an object but also having the additional capability of determining its range so as to provide complete information for use in robotics. More particularly, an image sensing array is made up of a number of rows of detector pairs similar to that found in my above-referred to patent so as to form a two dimensional array. Light from the object being sensed is focussed on the lenslet array and the detector pairs all receive images of the exit pupil of the lens in such a way as to, in effect, see an image of the remote object. The outputs of all the detectors together may then be used like a normal optical array so that an appropriate computer can analyze the two dimensional image to confirm the identity of the object and, in addition, the output from one or more rows of detectors can be used for determining the range to that object in accordance with the principles discussed in the above-referred to patent.

BRIEF DESCRIPTION OF THE DRAWINGS

FIG. 1 is a schematic diagram showing the image panel of the present invention; and FIGS. 2-4 are alternate embodiments of the detector array used in the image panel of FIG. 1.

DETAILED DESCRIPTION OF THE PREFERRED EMBODIMENTS

In FIG. 1, a lens 10 is shown receiving radiation from a remote object from the left shown by arrow 11 lying along the optical axis of lens 10. This radiation is focussed by lens 10 onto a lenslet array 15 which is comprised, for purposes of explanation, of five rows of five lenslets in each row. Each lenslet is such as is identified by reference numeral 17 in the upper left end of array 15. While in the embodiment described in FIG. 1, five rows of five lenslets are employed, it should be understood that any convenient number of rows and columns of lenslets may be used as is necessary to effectively determine the image characteristics of the object being viewed and its range. Behind the lenslet array 15, and normally mounted next to the array 15, is a detector array 19 upon which a plurality of detector pairs such as detectors 20 and 21 are arranged in such a manner that each detector pair lies behind one of the lenslets 17 on the lenslet array 15. In a manner similar to that described in my above-referred to patent, each detector pair will receive an image of the exit pupil of lens 10 representative of the intensity of light from some small area on the remote object. If the object is in the proper focus position, then the amount of radiation seen by detector 20, for example, will equal the amount of radiation seen by detector 21. On the other hand, if the object is at other than a proper focus position, the amount of radiation seen by detectors 20 and 21 will differ and as explained in my above-referred to patent, the outputs from a number of detectors in a row enables one to determine the range to the remote object.

In FIG. 1, a connection shown as cable 25 extends from the detector array 19 to a box 26 labelled "RANGE" so that an output signal on a conductor 27 indicative of the range to the remote object is obtained as is described in my above-referred to patent.

Since in FIG. 1 a number of rows of detectors are used and since each pair of detectors receives radiation from a different point on the remote object, it can be seen that an image of the remote object is, in effect, sensed by the detector pairs in the whole array. Thus, if the outputs of detector pairs are combined the detector array 19 would be very similar to the standard optical detector array sensing the image from the remote object. The outputs from all of these detectors is shown on a cable 30 leading to an image micro processor 32 which is programmed in order to determine the characteristics desired and whether or not the image being sensed by the array 19 corresponded to such an image. The output of image processor 32 on a line 40 may be a signal indicative of the identity of the remote object as, for example, whether or not a round shaped or square shaped object were being viewed. This information is presented to a box 42 identified as "ROBOT" which box is also connected to line 27 from the range determination device 26. Accordingly, the robot 42 receives information not only as to the identity of the object being viewed but also its range. Accordingly, the robot may act by a mechanical connection shown as dashed line 50 to perform some operation on the remote object such as picking it up or moving it.

FIG. 2 shows an alternate embodiment of the detector array in which, instead of using a pair of detectors behind each lenslet, four separate detectors are employed such as is shown by reference numerals 55, 57, 59 and 61. Using four detectors behind each of the lenslets enables the system to utilize both vertical and horizontal pairs of detectors for determining range. In other words, if the remote object were in proper focus, then detectors 55, 57, 59 and 61 would be receiving the same amount of radiation. But if the object were to move out of focus, then the amount of radiation received by detectors 55 and 57 would change and so would the amount of radiation received by detectors 55 and 59 as well as that received by detectors 57 and 61. Accordingly, by the methods shown in the above-referred to patent, the outputs of detectors 55 and 59 combined could be compared with the outputs of detectors 57 and 61 combined for range finding or the outputs of detectors 55 and 57 combined could be compared with the outputs of detectors 59 and 61 for range finding according to the principles set forth in my above-indentified patent. This allows one to either use rows or columns to extract the range information desired.

To avoid combining outputs, the arrays could be made of detector combinations as shown in FIG. 3 or in FIG. 4.

As an alternate use for the present invention, it should be realized that the detectors of FIG. 1, for example, sense the image of the object from different areas of the lens 10. As such, the outputs of a detector pair, such as 20 and 21, are, in fact, a portion of a stereo pair. Thus, in FIG. 1, by using a large array of detectors and connecting their outputs by way of a cable 68 to a display device 70, such as a TV receiver, so that the outputs of all of the left side detectors created a first image and the outputs of all of the right side detectors created a second image, the two images being displayed would, in effect, be a stereo image of the scene and if one of the viewer's eyes saw the first image and the other eye saw the second image, the viewer would be able to see a stereo TV picture.

For example, as is described in a copending application of Jurisson and Khalafalla, Ser. No. 35,173, filed May 2, 1979, now U.S. Pat. No. 4,286,286, and assigned to the assignee of the present invention, assume the image created by the outputs of the left side detectors were first displayed on the TV screen and then the image created by the output of the right side detectors were secondly displayed and this was repeated in rapid succession and assume the viewer wore glasses which were synchronized with the alternating images first left opaque, then right opaque, etc., the viewer would see the image in stereo.

It is therefore seen that I have provided a novel detector array for use in determining not only the image characteristics of an object but in determining its range and allowing the detector to be useful in systems such as robotics for performing functions on remote objects. I do not wish to be limited to the specific disclosures used in connection with the preferred embodiment and wish only to be limited by the following claims.

The embodiments of the invention in which an exclusive property or right is claimed are defined as follows:

1. An image detection array comprising:
   lens means for transmitting radiation from a remote object;
   a lenslet matrix comprising a predetermined number of lenslets arranged in rows and columns and mounted to receive radiation transmitted by the lens means; and
   a detector array mounted adjacent the lenslet matrix and comprising a plurality of substantially equal sized detectors arranged in pairs with at least one pair behind each lenslet so as to receive an image of the exit pupil of the lens means, the outputs of the detectors producing a first resultant signal indicative of the shape of the remote object.

2. Apparatus according to claim 1 wherein the outputs of selected ones of the pairs of detectors produce a second resultant signal indicative of the range to the remote object.

3. Apparatus according to claim 2 wherein two pairs of detectors are behind each lenslet.

4. Apparatus according to claim 2 wherein the outputs of the detector pairs are combined and the combined outputs produce the first resultant signal and the outputs of the selected ones of the detector pairs are compared to determine relative intensity to produce the second resultant signal.

5. Apparatus according to claim 2 further including an industrial robot and means connecting the robot to the detector array to provide the first and second resultant signals as control signals for the robot.

6. Apparatus according to claim 1 further including viewing means and means connecting the detector array to the viewing means to provide the first resultant signal as a stereo signal for the viewing means.

* * * * *